Jan. 21, 1964
J. M. CORK
3,118,181
RETREADING APPARATUS
Filed Nov. 21, 1960
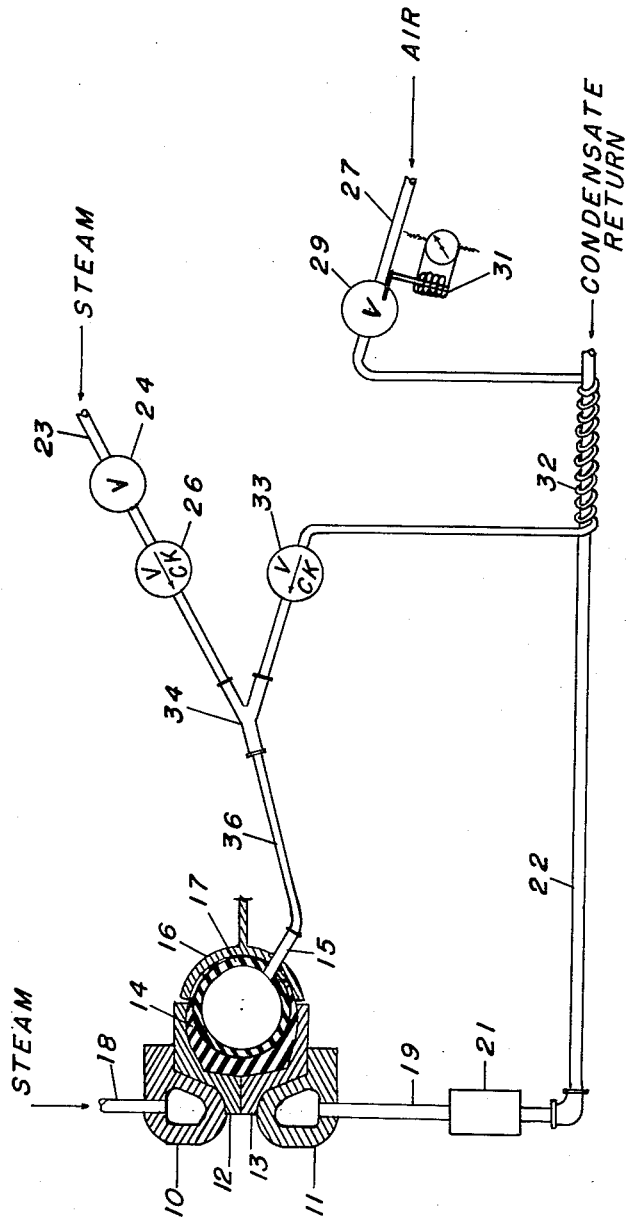
JOHN M. CORK
INVENTOR.
BY
Attorneys United States Patent Office 3,118,181
Patented Jan. 21, 1964

3,118,181
RETREADING APPARATUS
John M. Cork, 1336 Alma St., Lakeland, Fla.
Filed Nov. 21, 1960, Ser. No. 70,899
2 Claims. (Cl. 18—18)

This invention relates to tire retreading apparatus and particularly to a means and method for supplying steam and air to the interior of a tire during the vulcanizing and curing of the retread rubber.

One object of my invention is to provide means for supplying steam under pressure to the interior of a tire for a predetermined period of time during the retreading operation, followed by the introduction of air, and in which a portion of the steam is brought into the interior of the tire with the air by induced flow whereby to prevent sudden cooling of the interior of the tire and injury to the rubber.

A further object of my invention is to provide means for introducing steam and air under pressure into the interior of a tire during the retreading operation in which the air flow into the interior of the tire is at a higher pressure than the steam and in which there is an induced flow of steam into the tire with the air.

Another object of my invention is to provide retreading apparatus of the character designated in which the air introduced into the interior of the tire is first heated by conduction from the condensate return line from the mold and is further heated by an induced flow of steam into the tire with the air, together with means to prevent a back flow of air and stream to their respective sources of supply.

In the retreading of rubber tires for motor vehicles, as heretofore known to me, it has been the standard practice to place the tire, surrounded by new rubber, into a mold heated by steam pressure to rubber vulcanizing temperature. Cold air under pressure is then admitted to an expansible chamber within the tire to force the newly applied rubber into the mold design while it is being cured. In such a method, heat is applied to the newly applied rubber solely from the outside. It has also been proposed to admit steam under pressure to the interior of the tire followed by the admission of cold air. Such a method however brings about a sudden condensation of steam in the tire and the consequent sudden cooling delays curing of the new rubber.

I have found that a more uniform cure of the rubber may be obtained and considerable time saved by admitting steam under pressure at vulcanizing temperature into the interior of the tire for a limited period of time, followed by the admission of air at a higher pressure, mixed with steam. On its way to the interior of the tire the air is mixed with steam and thus heated by means of an induced flow of steam with the air. It may also be further heated by conduction from the condensate return line from the mold.

Apparatus embodying features of my invention is illustrated in the accompanying drawing, forming a part of this application, in which the single view shows a fragment of a conventional mold in cross section with a tire in place therein, and with my improved pressure supply conduits and control devices shown diagrammatically in association therewith.

Referring to the drawing, I show a conventional retreading mold including relatively movable upper and lower sections 10 and 11, with retreading matrix sections 12 and 13. A tire 14 with new rubber on the tread portion is placed within the mold, being supported therein as by a rim 16. An expansible chamber which may be in the form of a tube 17, having a conventional filling valve 15, is placed within the tire whereby on the admission of pressure thereinto the tire is expanded and new rubber forming the tread of the tire is forced into the tread design carried by the matrix.

The mold sections 10 and 11 are heated by steam entering the upper mold section 10 by a conduit 18 and is circulated through both mold sections in a manner well known. A drain, or condensate return conduit 19, is connected to the lower section 11. A steam trap 21 is connected to the conduit 19 to separate condensate from the steam, and a condensate return line 22 is connected to the steam trap 21.

At 23 I show a steam supply conduit which is controlled by a valve 24. A non return check valve 26 prevents any back flow of pressure through the conduit. An air supply conduit 27 is controlled by a valve 29 operated by a well known type of time responsive device 31. Included in the conduit 27 is a coil 32 which surrounds the condensate return line 22, whereby to heat the air as it flows through the conduit. A nonreturn check valve 33 prevents any back flow of pressure in the conduit 27.

The conduits 23 and 27 are joined at acute angles to each other, as shown, to a Y fitting 34 which, in turn, is connected to a tube 36 and thence to the filling valve 15 carried by the tube 16.

In operation, the tire 14 is placed within the heated mold 10—11 with new rubber applied to the tread portion. The valve 24 is opened to admit steam to the interior of the tire through the conduits 23 and 36, at a temperature suitable for curing the new rubber, for example, at a pressure of around 60 pounds gauge, and at a temperature around 307° F. This pressure however is insufficient to force new rubber into the tread pattern in the matrix.

At the same time the valve 24 is opened, the timing device 31 is set to open the air supply valve after a predetermined interval of time, usually after about 8 minutes. The valve 29 is then opened by the timing device 31 and air at a higher pressure than the steam, preferably at around 125 pounds gauge pressure per square inch, flows into the tire. As the air flows through the Y fitting 34 on its way to the expansible tube 17 its pressure is reduced so that it induces a flow of steam with the air into the tube 17. As soon as the pressure in the tube 17 builds up above that of the steam supply, the nonreturn check valve 26 closes and there is no further flow of steam into the tube 17. I thus provide a means whereby the introduction of cold air into the tire is avoided and I thereby obtain a quicker, more satisfactory cure.

It will be seen that when the valve 24 is opened to admit steam into the tire, the check valve 33 will close preventing any flow of steam back through the supply conduit 27. Then when the time controlled valve 29 is opened the higher air pressure forces the check valve 33 open and as soon as sufficient pressure builds up in the conduit 23, it closes the check valve 26 so that there is no further flow of steam through conduit 23. Also, the requisite air pressure will be maintained in the tire during the curing of the rubber. It am thus enabled to supply the interior of the tire with the required amount of steam and air to avoid damage to the tire due to sudden introduction of cold air and to insure rapid curing of the rubber. I have found that the interval of time between the opening of the steam valve 24 and the air supply valve 29 is very important and for that reason the operation of the valve 29 by an automatic timing device becomes important in the way of preventing overheating of the interior of the tire or sudden cooling caused by the introduction of cold air.

As heretofore pointed out, I may also include in the air supply conduit 27 the coil 32 surrounding the condensate return line 22, thereby providing more heat for the incoming air.

From the foregoing it will be seen that I have provided a simple effective means for supplying steam and air under pressure to the interior of a tire being retreaded, which requires a minimum of controls and a minimum of personal attention. In actual operation I have found that the time for retreading a tire, using my improved method and apparatus, is reduced from 15% to 25%.

As many apparently widely different embodiments of this invention may be made without departing from the spirit and scope thereof, it is to be understood that the invention is not limited to the specific embodiment thereof except as defined in the appended claims.

What I claim is:

1. In apparatus for retreading motor vehicle tires including a steam heated mold in which the tire is placed, a matrix in the mold surrounding the tire, and an expansible chamber within the tire, the combination of
    (a) a steam supply conduit for the expansible chamber,
    (b) a valve in the steam supply conduit for controlling the admission of steam to the expansible chamber,
    (c) a source of steam under pressure for the steam supply conduit,
    (d) an air supply conduit for the expansible chamber,
    (e) a source of air under a pressure higher than the steam pressure for the air supply conduit,
    (f) a valve in the air supply conduit for admitting air to the expansible chamber operable responsive to the passage of a predetermined interval of time after admission of steam to the expansible chamber,
    (g) and a Y fitting to which both the steam supply conduit and the air supply conduit are connected at acute angles to each other and which merge into a single conduit connected to the expansible chamber, whereby to induce a flow of steam with the air into the expansible chamber.

2. In apparatus for retreading tires including a steam heated mold in which a tire is placed, a matrix in the mold surrounding the tire and an expansible chamber within the tire, the combination of a steam supply conduit for the expansible chamber, an air supply conduit for the expansible chamber, a source of steam under pressure for the steam supply conduit, a source of air under a higher pressure for the air supply conduit, a Y fitting to which the air and steam supply conduits are both connected at acute angles to each other and which merge into a single conduit connected to the expansible chamber, a valve controlling the admission of steam to the steam supply conduit, a valve operative responsive to a predetermined interval of time controlling the admission of air to the air supply conduit, and a check valve in both the air supply conduit and the steam supply conduit between said first mentioned valves and the Y fitting operative to prevent a back flow through said conduits.

References Cited in the file of this patent

UNITED STATES PATENTS

| | | |
|---|---|---|
| 1,125,609 | Warner | Jan. 19, 1915 |
| 1,380,426 | Seward | June 7, 1921 |
| 1,757,053 | Minor | May 6, 1930 |
| 1,884,231 | Reeder | Oct. 25, 1932 |
| 2,051,795 | Daniel | Aug. 18, 1936 |
| 2,066,265 | Freeman | Dec. 29, 1936 |
| 2,204,531 | Erbguth et al. | June 11, 1940 |
| 2,338,040 | Kerr | Dec. 28, 1943 |
| 2,782,460 | Hans-Dietrick Krug et al. | Feb. 27, 1957 |
| 2,791,805 | White | May 14, 1957 |
| 2,983,488 | Thompson | May 9, 1961 |